(12) United States Patent
Sanchez (10) Patent No.: US 10,354,534 B1
(45) Date of Patent: Jul. 16, 2019

(54) SYSTEM AND METHOD FOR IDENTIFYING A VEHICLE VIA AUDIO SIGNATURE MATCHING

(71) Applicant: BLUEOWL, LLC, San Francisco, CA (US)

(72) Inventor: Kenneth J. Sanchez, San Francisco, CA (US)

(73) Assignee: BLUEOWL, LLC, San Francisco, CA (US)

( * ) Notice: Subject to any disclaimer, the term of this patent is extended or adjusted under 35 U.S.C. 154(b) by 0 days.

(21) Appl. No.: 15/710,541

(22) Filed: Sep. 20, 2017

(51) Int. Cl.
  *G08G 1/04* (2006.01)
  *G08G 1/00* (2006.01)
  *G01V 1/00* (2006.01)

(52) U.S. Cl.
  CPC ............... *G08G 1/20* (2013.01); *G01V 1/001* (2013.01); *G06K 2209/23* (2013.01)

(58) Field of Classification Search
  CPC .......... G08G 1/20; G08G 1/017; G01V 1/001; G06K 2209/23
  See application file for complete search history.

(56) References Cited

U.S. PATENT DOCUMENTS

| | | | |
|---|---|---|---|
| 8,111,174 B2* | 2/2012 | Berger | G01H 3/08 340/943 |
| 8,983,677 B2* | 3/2015 | Wright | H04B 11/00 381/56 |

* cited by examiner

*Primary Examiner* — Cuong B Nguyen
(74) *Attorney, Agent, or Firm* — Marshall, Gerstein & Borun LLP; Randall G. Rueth (57) ABSTRACT

A computer-implemented method includes providing a first application to a mobile computing device that obtains a set of audio signals, transforms the set of audio signals into a set of signal features, wherein no audio signal in the set of audio signals can be derived from the set of signal features, and transmits the set of signal features to a remote computing system, without transmitting any portion of the set of audio signals. The method also includes receiving, at the remote computing system, the set of signal features, identifying a type of the vehicle at least in part by applying the set of signal features to a trained neural network, and one or both of (i) causing the identified type of the vehicle to be displayed, and (ii) causing the identified type of the vehicle to be provided to a second application.

20 Claims, 4 Drawing Sheets

SYSTEM AND METHOD FOR IDENTIFYING A VEHICLE VIA AUDIO SIGNATURE MATCHING

FIELD OF THE DISCLOSURE

The present disclosure generally relates to audio signal processing, and more specifically, to techniques for collecting and processing audio signals to determine a vehicle type (e.g., make and model).

BACKGROUND

In many applications, a need exists to classify or detect a vehicle type. For example, an automated car wash or other paid service may need to confirm the type of vehicle being driven through the gate for billing purposes. As another example, an electronic toll way or traffic control system administered by a government may need to identify a vehicle for verification and charging purposes. As yet another example, an insurance company may create an opt-in service that allows the company to reliably determine which of several vehicles in a multi-vehicle household is being driven. In this latter example, the aggregate risk with respect to a family or household may be calculated based on the knowledge of which vehicle is being driven by which member of the household at a particular time. Thus, there exists a need to classify vehicles in an accurate manner.

In theory, it is possible to classify vehicles by analyzing sounds generated by those vehicles (e.g., sounds emitted by the vehicle engines). However, such techniques would likely be costly (e.g., if utilizing dedicated audio sensors within the engine compartment), and/or may give rise to privacy concerns (e.g., if utilizing audio sensors within the passenger cabin). With regard to privacy, the idea that private communications may be recorded and transferred over the Internet—even if the amount of captured communications is de minimis—is unacceptable to many consumers. Despite the best intentions of the creators of useful products and services, the possibility of inadvertent disclosure or recording of sensitive personal data may exist, especially if the data is transmitted and/or stored remotely. In general, therefore, the collection and/or storage of audio data reflecting private communications is a liability for service providers.

BRIEF SUMMARY

In one aspect, a computer-implemented method for identifying a vehicle while preserving privacy of a vehicle operator includes providing a first application to a mobile computing device of the vehicle operator. The first application, when installed and executing on the mobile computing device, causes the mobile computing device to obtain a first set of raw audio signals captured by a microphone of the mobile computing device, and to transform the first set of raw audio signals into a first set of audio signal features, wherein no raw audio signal in the first set of raw audio signals can be derived from the first set of audio signal features. The method further includes transmitting, via a communication network interface of the mobile computing device, the first set of audio signal features to a remote computing system, without transmitting any portion of the first set of raw audio signals to the remote computing system. The method further includes receiving, at the remote computing system, the first set of audio signal features. The method further includes identifying, by the remote computing system, a type of the vehicle at least in part by applying the first set of audio signal features to a trained neural network and one or both of (i) causing, by the remote computing system, the identified type of the vehicle to be displayed to a user, and (ii) causing, by the remote computing system, the identified type of the vehicle to be provided as an input to a second application.

In another aspect, a computing system comprising one or more processors and one or more memories storing instructions is provided. When the instructions are executed by the one or more processors, the instructions cause the computing system to provide a first application to a mobile computing device of the vehicle operator. The first application, when installed and executing on the mobile computing device, causes the mobile computing device to obtain a first set of raw audio signals captured by a microphone of the mobile computing device. The instructions further cause the computing system to transform the first set of raw audio signals into a first set of audio signal features, wherein no raw audio signal in the first set of raw audio signals can be derived from the first set of audio signal features, and transmit, via a communication network interface of the mobile computing device, the first set of audio signal features to a remote computing system, without transmitting any portion of the first set of raw audio signals to the remote computing system. The instructions further cause the computing system to receive, at the remote computing system, the first set of audio signal features. The instructions further cause the computing system to identify, by the remote computing system, a type of the vehicle at least in part by applying the first set of audio signal features to a trained neural network, and one or both of (i) cause, by the remote computing system, the identified type of the vehicle to be displayed to a user, and (ii) cause, by the remote computing system, the identified type of the vehicle to be provided as an input to a second application.

DETAILED DESCRIPTION

The embodiments described herein relate to, inter alia, identifying a vehicle while preserving privacy of a vehicle operator. More specifically, in some embodiments, an application is provided to a mobile computing device (e.g., smartphone or wearable electronic device) of the vehicle operator. The application causes the mobile computing device to capture raw audio signals via one or more microphones of the mobile computing device. The application may transform the signals into audio signal features. As the term is used herein, an audio signal "feature" is something (e.g., a parameter or set of parameters) that is derived from a raw audio signal, but from which audio content (e.g., human speech) within the raw audio signal has been irrevocably removed or obscured. Moreover, such audio content cannot be recovered even from a combination of multiple audio signal "features" of this sort.

The features may be transmitted—without the raw audio signals—from the mobile computing device to a remote computing system that receives the features and identifies, using a neural network, a vehicle type. Herein, a vehicle "type" may be a make, model, vehicle class (e.g., class 1 vehicle, class 2 vehicle, etc., per standardized truck classifications), or other suitable classification. This identified vehicle type may be displayed to a user, for example, and/or provided as input to a different application (e.g., to an application that uses the identified type in performing a further calculation, or in the evaluation of a conditional statement). By transmitting only the audio signal features, and not the raw audio, to the remote computing system, privacy of the vehicle operator (and any other vehicle occupants) is maintained.

Figure 1:
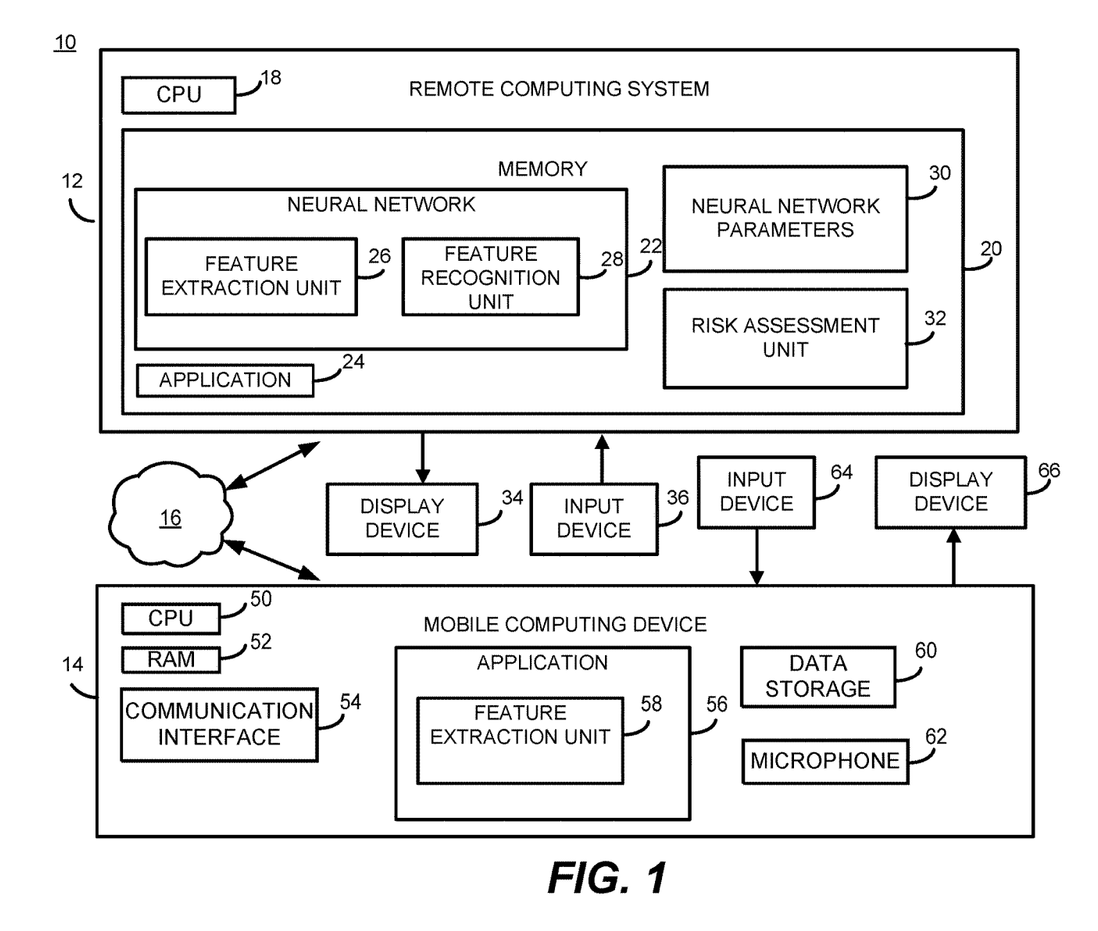
FIG. 1 depicts an example environment in which techniques for obtaining and transforming raw audio signals to produce audio signal features for determining vehicle type (e.g., make and model) may be implemented, in an embodiment.

FIG. 1 depicts an example environment 10 for collecting and processing raw audio signals to determine vehicle type, according to an embodiment. Environment 10 includes a remote computing system 12 and a mobile computing device 14. Remote computing system 12 may comprise one or more server computers, which may be implemented in a virtualized and/or cloud computing environment, for example. Remote computing system 12 may be owned and/or controlled by an entity such as an insurance company, for example. Mobile computing device 14 may be a mobile communications device of a user, such as a smartphone, a tablet, a wearable device, or any other suitable type of personal electronics device with wireless communication capabilities. Remote computing system 12 may communicate with mobile computing device 14 (and possibly a number of other, similar mobile computing devices of other users) via a network 16. Network 16 may include one or more suitable wireless networks, such as a 3G or 4G network, a WiFi network or other wireless local area network (WLAN), a satellite communication network, and/or a terrestrial microwave network, for example. In some embodiments, network 16 also includes one or more wired networks, such as Ethernet.

Remote computing system 12 may include a CPU 18 and a memory 20. While referred to in the singular, CPU 18 may include any suitable number of processors of one or more types (e.g., one or more CPUs, graphics processing units (GPUs), cores, etc.). Memory 20 may comprise one or more memories of one or more types (e.g., persistent memory, solid state memory, random access memory (RAM), etc.), and may store an application 24, a neural network 22 comprising a feature extraction unit 26 and a feature recognition unit 28, neural network parameters 30, and a risk assessment unit 32.

Neural network 22 may be any suitable type of neural network (e.g., a convolutional neural network, Bayesian model, etc.). Taken as a whole, neural network 22 is capable of processing raw audio signals to predict vehicle types. Feature extraction unit 26 is a portion of neural network 22 responsible for transforming raw audio signals to audio signal features, from which none of the original audio content (e.g., human speech) can be recreated or derived. Feature recognition unit 28 is a portion of neural network 22 responsible for analyzing the features generated/output by feature extraction unit 26. The configuration and operation of feature extraction unit 26 and feature recognition unit 28 are discussed in further detail below. It should be appreciated that neural network 22 may be trained using supervised learning techniques. In an alternative embodiment, neural network 22 may be trained using unsupervised classification techniques (e.g., clustering).

Neural network parameters 30 may comprise individual values (e.g., numeric values) used to initialize and/or configure neural network 22. In particular, neural network parameters 30 may include parameters (e.g., weights) that are set during the training of neural network 22, and applied during operation of neural network 22.

Application 24 may provide a wrapper, or package, for some of the functionality associated with neural network 22. In particular, application 24 may contain instructions that, when executed at a device, enable the device to use feature extraction unit 26. Specifically, after remote computing system 12 trains neural network 22, feature extraction unit 26 may be packaged in application 24 and made available for download to one or more (potentially very many) mobile devices, including mobile computing device 14. In an alternative embodiment, application 24 may be provided to a third party, which may make application 24 available for download from an application store or other third-party website, either for a fee or gratis.

Application 24 may comprise mobile application programming instructions and/or software (e.g., an Android Package Kit (APK) file), for example. In some embodiments, remote computing system 12 may build or compile application 24 in memory 20 based on source code and data contained in memory 20, and cryptographically sign application 24 and create application 24 as a read-only or protected file.

Remote computing system 12 may further comprise a risk assessment unit 32. Generally, risk assessment unit 32 may be responsible for quantifying risk relating to vehicle usage based on predictions output by neural network 22, e.g., for purposes of setting or adjusting an insurance premium for a policy covering the user of mobile computing device 14. In other embodiments, remote computing system 12 does not include risk assessment unit 32.

Remote computing system 12 may also comprise input/output (I/O) devices. I/O devices may include a display device 34 and an input device 36, which may respectively correspond to, for example, a computer video display and a hardware peripheral device (e.g., keyboard, mouse, etc.). In some embodiments, display device 34 and input device 36 may be combined or integrated into a single hardware device, such as a touchscreen.

Mobile computing device 14 may contain a CPU 50, a random access memory (RAM) 52, an application 56 that contains a feature extraction unit 58, a data storage 60, a microphone 62, an input device 64, and a display device 66. CPU 50 may be similar to CPU 18, for example. RAM 52 may comprise one or more random access memory modules, and software components of mobile computing device 14 may be loaded into RAM 52 when executed, operated upon, etc. Mobile computing device 14 may implement communication with remote computing system 12 via network 16 using communication interface 54 (e.g., a wireless or Ethernet networking card).

Application 56 may be a local copy of application 24 from remote computing system 12, and feature extraction unit 58 may be a local copy of feature extraction unit 26 of remote computing system 12 (e.g., if feature extraction unit 26 is packaged into application 24 as described above). Therefore, feature extraction unit 58 may have the same or substantially similar definition and capabilities as feature extraction unit 26. Data storage 60 may comprise persistent storage (e.g., a hard drive and/or solid state memory), and various components of mobile computing device 14 may read data from, and write data to, data storage 60. Microphone 62 may include one or more unidirectional and/or omnidirectional microphones capable of capturing/sensing raw audio signals, which may then be read by various applications, including application 56. Raw audio signals may be saved as digital sound files (e.g., in data storage 60), and may be encoded in WAV, MP3, FLAC, or any other suitable lossy or lossless file format.

It should be appreciated that although mobile computing device 14 is described above as a mobile device, it may in other embodiments be a relatively "dumb" node or terminal, such as an IoT device with little memory and/or processing power, or a stationary device such as a server or a permanent fixture of a vehicle. Moreover, mobile computing device 14 may be a device or system that is deployed in a harsh terrain or another location not typically associated with server deployments (e.g., in a toll way or car wash environment).

In operation, remote computing system 12 may train neural network 22 using labeled sets of raw audio training signals from a number of different vehicles. These training inputs may be stored in an electronic database (not shown in FIG. 1) that is within, or otherwise accessible by, remote computing system 12. Each raw audio signal (or, in some embodiments, each set of multiple raw audio signals) may correspond to a respective vehicle type. All raw audio signals may correspond to different vehicle types or, in some embodiments and/or scenarios, some vehicle types may be associated with multiple raw audio signals that each correspond to a different instance of the same vehicle type.

In some embodiments, neural network 22 may be trained on raw audio signals corresponding to only a small subset of possible vehicle types. For example, neural network 22 may be tailored to distinguishing only among twenty specific vehicle types, or only among two specific vehicle types, etc. This subset of vehicle types may consist of vehicle types that are known to be more likely in a certain setting or context (e.g., if the entity or company operating remote computing system 12 has a priori knowledge of which vehicle types may be associated with the vehicle operator). In that case, a priori knowledge may be sourced from customer information, such as an insurance policy, or may be based on another indicator of likely vehicle types such as geography or region. In some embodiments where neural network 22 is only trained on a smaller subset of vehicle types, remote computing system 12 may train a number of other, similar neural networks to handle classification of other vehicle types Outputs from the first layer of neural network 22 may comprise audio signal "features," as discussed above. Thus, the first layer of neural network 22 may be referred to herein as the "feature extraction layer." Layers after the feature extraction layer may be referred to herein as "feature recognition layers" (i.e., the layers other than those identified as feature extraction layers), because those layers analyze the features to recognize/identify the corresponding vehicle type. Feature extraction unit 26 may correspond to the feature extraction layer of neural network 22, and feature recognition unit 28 may correspond to the feature recognition layers.

In an alternative embodiment, the audio signal features are output by the second (or third, fourth, etc.) layer of neural network 22, rather than the first layer. Thus, more generally, feature extraction unit 26 may correspond to the first x contiguous layers of neural network 22, and feature recognition unit 28 may correspond to the remaining/subsequent L−x layers of neural network 22, where L is the total number of layers (not including the inputs and outputs, which are sometimes referred to in the art as the "input layer" and "output layer," respectively), and where L is greater than x. The feature extraction and feature recognition layers should therefore be understood as forming two parts of neural network 22, which collectively form the whole neural network 22, where the feature extraction layer(s) is/are responsible for transforming raw audio signals to features, and the feature recognition layer(s) is/are responsible for further analysis of those features to generate a predicted vehicle type.

The feature extraction layer(s) may be included in application 24 as feature extraction unit 26. As discussed above, a copy of application 24 (including feature extraction unit 26) may then be downloaded to mobile computing device 14 via network 16, and stored in data storage 60 as application 56 (including feature extraction unit 58). For example, this may occur when a user executes an installation command on the mobile computing device 14, by choosing to install application 56 from an application store. The user may then drive his or her vehicle, while mobile computing device 14 (e.g., if a smart phone or wearable device) is on his or her person. While the user is driving, mobile computing device 14 may execute application 56, which may read raw audio signals (generated during/by operation of the vehicle) from microphone 62, and provide the raw audio signals to feature extraction unit 58. Execution of application 56 by mobile computing device 14 may be in response to the user having launched application 56 by an affirmative action, or application 56 may execute in the background and start recording audio when the user drives (e.g., if application 56 records audio for the purpose of providing a driving discount). For example, application 56 may have been transferred from remote computing system 12 to mobile computing 14 to allow drivers to lower their insurance premiums, if the drivers expressly consent to allow the entity associated with remote computing system 12 to collect driving-related data (e.g., for risk analysis, accident avoidance, etc.).

When raw audio corresponding to a vehicle is being produced, such as when the user is driving (or stationary with an idling engine, etc.), feature extraction unit 58 may, upon receiving raw audio signals from microphone 62, transform the signals into features from which information private to the user and/or other occupants (e.g., the content of speech) has been irrevocably removed or obscured, as discussed above. Depending upon the embodiment, and if the audio signals comprise a conversation between the driver and another person, the transformation performed by feature extraction unit 58 may or may not produce features from which it is possible to determine, in a general sense, that the features correspond to human speech. Regardless of whether a general determination of this sort can be made, however, no content of the conversation can be determined from the features. Further, the transformation does not remove all information pertaining to the vehicle type. That is, the features retain at least some information useful for determining the type (e.g., make and model) of a vehicle. It should be understood that many sources of sound, beyond just the engine, may be indicative of vehicle type, such as the overall decibel level within the cabin of the vehicle, squeaking of interior plastic components, sounds produced by the transmission system, etc. Other indicia of vehicle type may include "transition" noises, such as the noise a vehicle makes when the ignition is engaged, when the engine is first put in gear after idling, while the vehicle is turning (as opposed to driving in a straight line), and so on.

In some embodiments, other data (e.g., telematics data) from mobile computing device 14 may be combined with the audio features to make predictions as to vehicle type. For example, mobile computing device 14 may include an accelerometer, and data from the accelerometer may be read by mobile computing device 14 and transmitted to remote computing system 12. The accelerometer may, for example, provide an indication that the vehicle accelerated to a speed of 100 km/h in 5.1 seconds. Based on the acceleration information, remote computing system 12 may initialize neural network 22 using different neural network parameters 30. For example, neural network 22 may consider only vehicle types corresponding to high performance vehicles in predicting vehicle type. It should be understood that other data from mobile computing device 14 may be used at any stage of the prediction, not only to affect a trained neural network but also before the neural network has been trained (i.e., during the training process). As another example, mobile computing device 14 may contain a sensor that detects the state of the windows of the vehicle (e.g., passenger and driver windows, rear windows, and/or sun/moon roof), and may transmit that data to remote computing system 12. If remote computing system 12 determines that the windows are rolled down at a time corresponding to a particular audio signal, then remote computing system 12 may compensate for additional ambient noise by, for example, adjusting the weights of a subset of neural network parameters 30, or by instructing mobile computing device 14 to use an audio filter to remove noise from the raw audio signals before the raw audio signals are processed by application 56, etc.

Mobile computing device 14 may transmit the features identified by feature extraction unit 58 to remote computing system 12 (e.g., via communication interface 54 and network 16). Mobile computing device 14 may transmit the features via HTTP or another suitable network transfer protocol, for example, and/or may require a secure (i.e., encrypted) and/or credentialed transport layer. In some embodiments, the features may be cached (e.g. in data storage 60) for later transmission, e.g., if a network connection of network 16 is not available.

Having received the audio signal features, remote computing system 12 may provide the features as input to feature recognition unit 28 of neural network 22, which may predict a vehicle type. Predictions of feature recognition unit 28 may include any suitable indicia of vehicle type, such as vehicle make and/or vehicle model. For example, remote computing system 12 may output the prediction (Jeep, Cherokee), or the prediction (BMW, i8), etc. Of course, other suitable formats may be used. In some embodiments and/or scenarios, vehicle sub-models may be predicted with specificity. For example, "Jeep Cherokee Classic" and "Jeep Grand Cherokee SRT" are both possible vehicle type predictions, as are merely "Jeep" or "BMW." It should be understood that vehicle make and model designations may vary between manufacturers, and specific or customized logic may be implemented to achieve the desired uniformity and precision of the predictions.

In addition to the type (e.g., make and model) information, feature recognition unit 28 may generate a prediction confidence factor that corresponds to the make and/or model predicted. For example, the following are possible vehicle type predictions with associated confidence factors: ((BMW, 5 Series, 0.8), (BMW, i8, 0.2)). The confidence factors may or may not sum to 1.0. Moreover, there may be a single confidence factor for make and model, or separate confidence factors for make and model, respectively. Confidence factors of this sort may help a person or system interpreting the results of neural network 22 to make further use of the predictions.

In some embodiments where neural network 22 is trained for a comprehensive set of known or relatively common vehicle types, predictions from neural network 22 may be confirmed by comparing the predicted vehicle types to the vehicles known to belong to a household associated with the user of mobile computing device 14. For example, the confidence factors discussed above may include scores for different vehicle types, and those scores may be used in combination with the vehicle types known to correspond to the household associated with the user to select a particular vehicle type.

It should be understood that the identified vehicle type may be used for many different purposes, depending upon the embodiment. For example, once remote computing system 12 has identified a vehicle type, the type may be provided to risk assessment unit 32, which may, based exclusively on the vehicle type or in combination with other information (e.g., the identity of the vehicle operator, the weather conditions when the user is driving, the user's acceleration/braking/cornering behaviors, etc.), determine a level of risk associated with the driver, an insurance policy that lists the driver, and/or the operation of the vehicle.

In some embodiments, neural network 22 is used to predict vehicle types for multiple trips of the user of mobile computing device 14. Moreover, neural network 22 (or another, similar neural network stored in memory 24 or elsewhere) may be used to predict vehicle types for multiple trips of one or more other users listed on a same insurance policy as the user of mobile computing device 14. In this scenario, risk assessment unit 32 may account for which driver drove which vehicle (of a multi-vehicle household) when determining risk. For example, risk assessment unit 32 may assess different levels of risk depending on whether a teenage member of the household drove the Dodge Caravan or the Porsche 911 Turbo.

It may be advantageous for vehicle type to be shown to a human operator. Thus, in some embodiments, the vehicle type may be displayed via display device 34. For example, a computer system belonging to an underwriting department of an insurance company may display a listing of trips taken by an insured, with the detected vehicle type being displayed along with each respective trip. Alternatively, a car wash or toll way operator may keep an historical record of cars driven through the gate, with each record comprising the vehicle type as predicted by neural network 22 (possibly in association with the license plate of the vehicle and/or other identifying information, etc.). Before or after the historical record is captured, the record may be displayed in real-time to an attendant of the car wash or toll booth in a graphical display.

In various embodiments, risk assessment unit 32 may be included within application 22, or may be included in a different application, and may or may not be located within remote computing system 12. For example, remote computing system 12 may merely transmit vehicle type predictions to another system for further processing or analysis.

It should be understood that alternative embodiments are contemplated, including alternatives in which features are known or discovered without first having trained any neural networks, and without any part of a neural network being transmitted to mobile computing device 14. For example, neural network 22 may instead be trained using labeled feature sets (i.e., not raw audio). In this alternative embodiment, neural network 22 may not be divided into feature extraction unit 26 and feature recognition unit 28, and application 56 (and application 24) does not necessarily contain any part of neural network 22. Application 56 may comprise any algorithm capable of transforming raw audio signals to the same kinds of features that were used to train neural network 22. The features may be ones that were identified by a computerized process that does not include neural network training, such as a heuristic algorithm, or even manually identified/selected by system programmers or designers.

Figure 2:
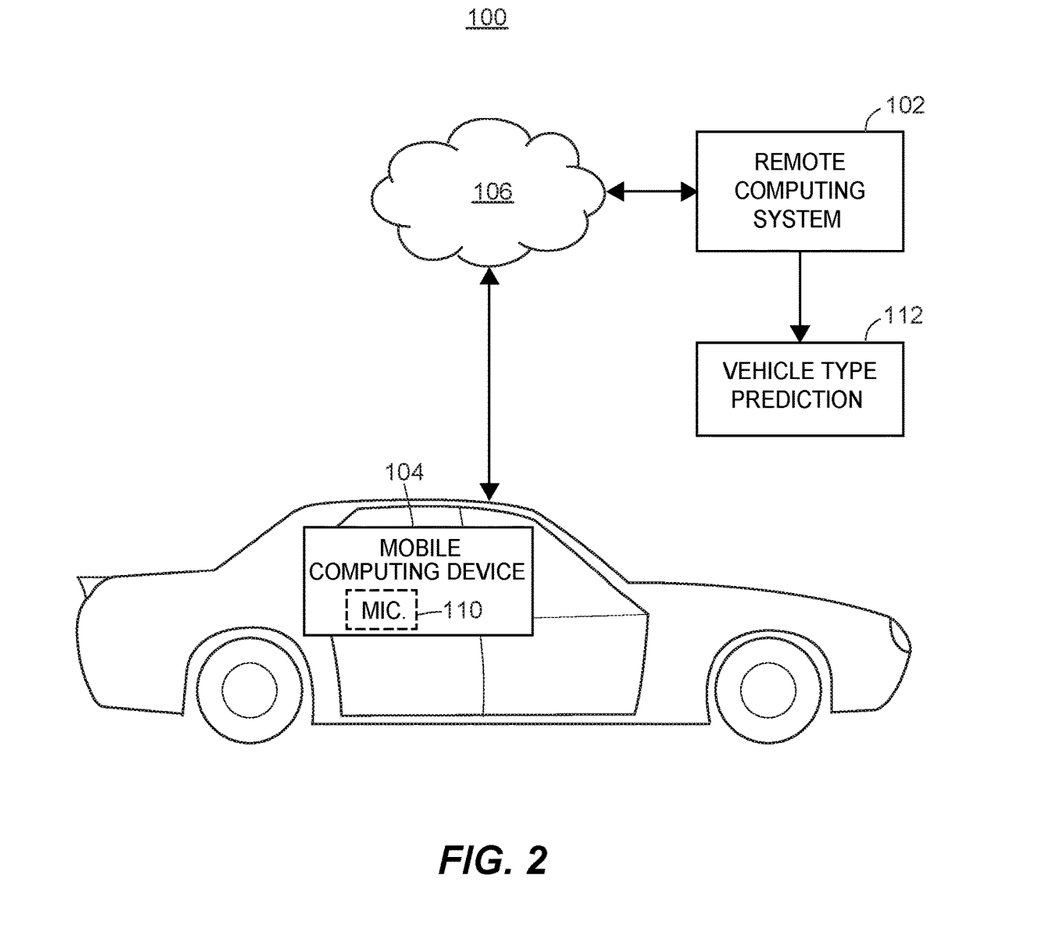
FIG. 2 is a diagram depicting a remote computing system in which audio signal features may be collected from a vehicle, and analyzed to determine the vehicle type.

FIG. 2 depicts an example environment 100 comprising a remote computing system 102, a mobile computing device 104, a network 106, and a vehicle 108. Vehicle 108 may be any conveyance, wheeled or otherwise. For example, vehicle 108 may be a passenger vehicle, motorcycle, tractor trailer, garbage truck, pontoon boat, etc. Mobile computing device 104 may include, or be communicatively coupled to, a microphone 110. As discussed below, more than one microphone may be installed in vehicle 108.

The components of FIG. 2 may correspond to the components depicted in FIG. 1. For example, remote computing system 102 may correspond to remote computing system 12, mobile computing device 104 may correspond to mobile computing device 14, network 106 may correspond to network 16, and/or microphone 110 may correspond to microphone 62, with each of the foregoing respective pairs of elements behaving substantially similarly to each other.

Microphone 110 is depicted as being integral to mobile computing device 104. However, it should be appreciated that mobile computing device 104 may or may not include a microphone, or may include a microphone that is not used for the techniques described herein. For example, microphone 110 may instead be located on a wheel of the vehicle 108, or elsewhere (e.g., in a fender or wheel well). In various embodiments, microphone 110 may be located within the cabin of vehicle 108, within the body or engine compartment of vehicle 108, or outside of (e.g., externally mounted to) vehicle 108. Microphone 110 may include multiple microphones of any number and type(s), in any one or more of the aforementioned locations. If external to mobile computing device 104, microphone 110 may be communicatively coupled to mobile computing device 104 (e.g., via a wireless network local to vehicle 108). Moreover, in various embodiments, mobile computing device 104 may directly transmit audio feature data to remote computing system 102, or vehicle 108 may include a built-in system (not depicted) that transmits audio feature data to remote computing system 102.

Figure 3:
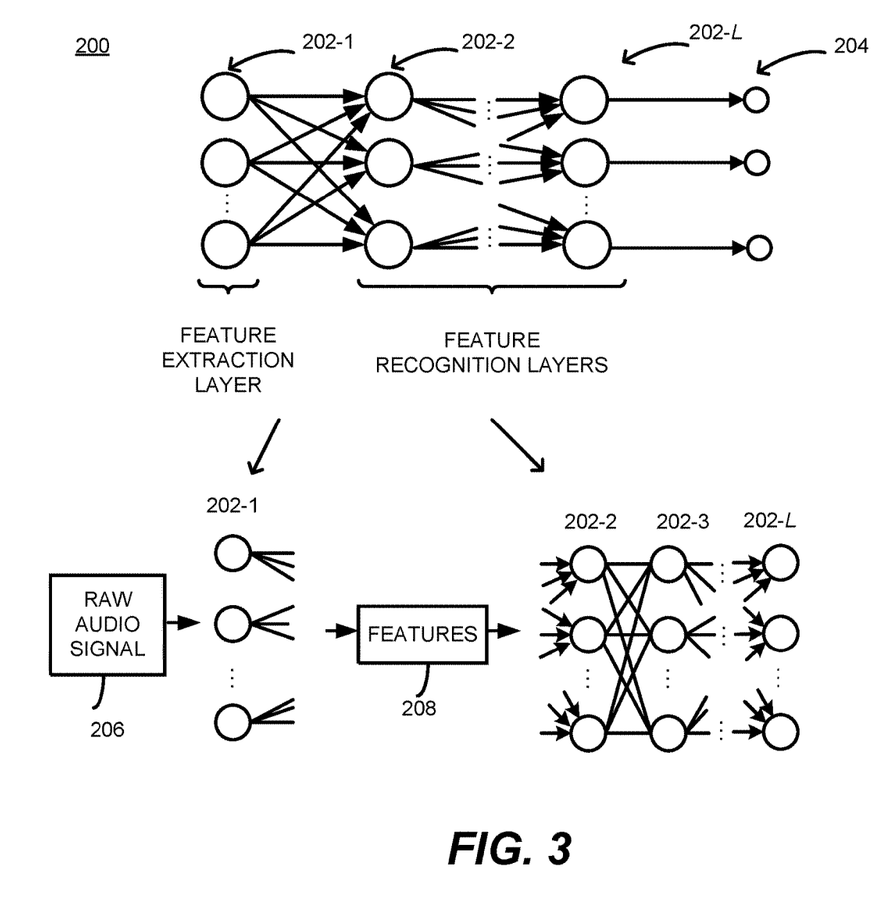
FIG. 3 depicts an example neural network that may be used to identify a vehicle.

FIG. 3 is an example neural network 200 that may be used to identify a vehicle type. Neural network 200 may correspond to neural network 22 of FIG. 1, for example. Neural network 200 may include a plurality of layers 202-1 through 202-L, wherein each layer comprises one or more interconnected neurons. It is to be understood that FIG. 3 does not depict the inputs to neural network 200 (sometimes referred to as the "input layer"), and that layer 202-1 is the layer to which the inputs are applied. Neural network 200 may additionally comprise an output layer 204. Neural network 200 may be divided into two units. For example, and with reference to FIG. 1, layer 202-1 of neural network 200 may correspond to feature extraction unit 26 of neural network 22 (and to feature extraction unit 58), and layers 202-2 through 202-L of neural network 200 may correspond to feature recognition unit 28 of neural network 22. As discussed above with respect to FIG. 1, in general, any number of non-overlapping, initial (non-input) layers of the neural network may constitute feature extraction unit 26, and the remaining (non-output) layers may constitute feature recognition unit 28.

As depicted, a raw audio signal 206 may be input to feature extraction layer 202-1. Raw audio signal 206 may include audio waveforms representing the noise generated by the engine (and/or other components) of vehicle 108 of FIG. 2, as well as any noises generated within the cabin (e.g., human conversation) and any noises from outside the cabin (as filtered by open or closed windows, etc.). Feature extraction layer 202-1 may transform raw audio signal 206 into features 208 (e.g., at a mobile device, as part of a distributed application). As discussed above, features 208 may be transmitted via an application, such as application 56 of FIG. 1, to a remote computing system (e.g., remote computing system 12 of FIG. 1), where feature recognition layers 202-2 through 202-L may be located. Features 208 may then be input into feature recognition layers 202-2 through 202-L, which may in turn output one or more predictions as discussed above. Features 208, if inspected by a human or computer, would not reveal any portion (time segment) of raw audio signal 206, yet contain information sufficient to allow feature recognition layers 202-2 through 202-L to produce an accurate or relatively high-confidence prediction of vehicle type. Features 208 may comprise any suitable type of data (e.g., numeric values).

Figure 4:
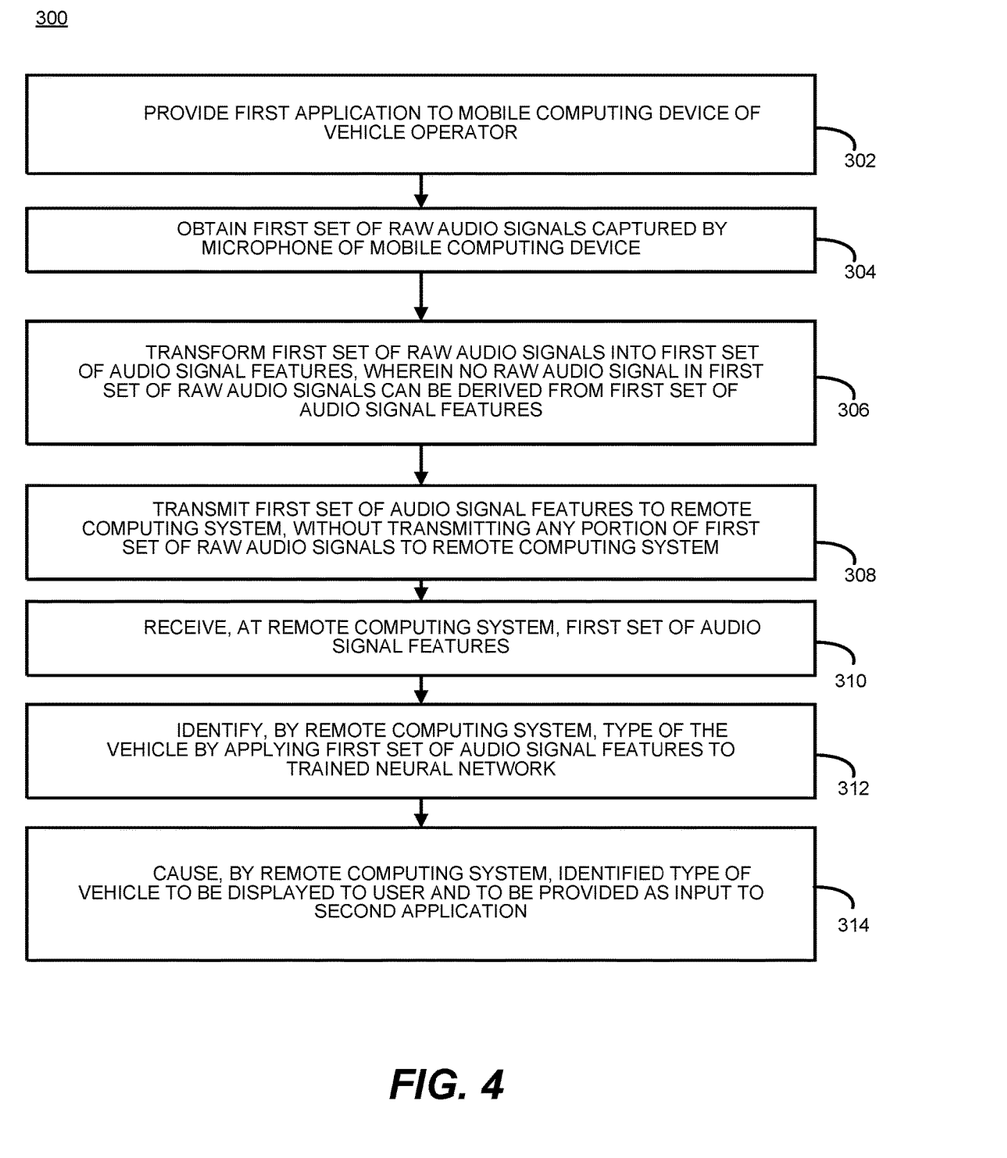
FIG. 4 is a flow diagram of an example method for identifying a vehicle while preserving privacy of a vehicle operator and/or other passengers.

FIG. 4 is a flow diagram of an example method 300 for identifying a vehicle while preserving privacy of a vehicle operator. The method 300 may be implemented by one or more processors of a computing device or system, such as CPU 18 of remote computing system 12 in FIG. 1.

In the method 300, a first application is provided to a mobile computing device of a vehicle operator (block 302). A first set of one or more raw audio signals is captured by a microphone of the mobile computing device (block 304). In an embodiment, the capturing may occur while the vehicle is motion, or when an event occurs such as the vehicle ignition being activated. After the first set of raw audio signals is captured, the first set of raw audio signals is transformed into a first set of one or more audio signal features (block 306), where no raw audio signal in the first set of raw audio signals can be derived from the first set of audio signal features.

Next, the first set of audio signal features is transmitted to the remote computing system, without transmitting any portion of the first set of raw audio signals to the remote computing system (block 308). The remote computing system receives the first set of audio signal features (block 310), and identifies the vehicle type by applying the first set of audio signal features to a trained neural network (e.g., neural network 26 of FIG. 1) (block 312). Block 312 may comprise identifying a vehicle make and/or model, for example. In some embodiments, a priori knowledge of which vehicle types are associated with the vehicle operator may also be used to help identify the vehicle, e.g., as discussed above. After the vehicle type is identified, the remote computing system causes the vehicle type to be displayed to a user and/or to be provided as input to a second application (block 314). The second application may be an application that assesses the risk associated with the vehicle operator, for example.

The method 300 may include more, fewer, and/or different blocks than those shown in FIG. 4. For example, the method 300 may include an additional block in which the neural network is trained using sets of audio signal features, and, for each of the feature sets, a vehicle type known to correspond to that feature set. Each of the sets of audio signal features may correspond to a different one of a plurality of vehicles, for example, and at least some of the sets of audio signal features may correspond to different types of vehicles. Each of the sets of audio signal features may include types of features that correspond to the types of features found within the first set of audio signal features. Data that specifies the feature types may be provided to the mobile computing device at block 302 (e.g., may be indicated by data included with the first application), for example, to let the mobile computing device know which types of features to generate at block 306.

As another example, the method 300 may instead include an additional block in which an initial neural network is trained using sets of raw audio signals, and, for each of the sets (i.e., for use as a respective label during the supervised learning process), a vehicle type known to correspond to that set. Each of the sets of raw audio signals may correspond to a different one of a plurality of vehicles, for example, and at least some of the sets of raw audio signals may correspond to different types of vehicles. In one such embodiment, the trained neural network is generated by using only one or more back-end layers of the initial trained neural network as the trained neural network. In this embodiment, the various types of features within the first set of audio signal features may correspond to intermediate outputs that one or more front-end layers of the initial trained neural network provide to the one or more back-end layers of the initial trained neural network.

Additional Considerations

With the foregoing, an insurance customer may opt-in to a rewards, insurance discount, or other type of program. After the insurance customer provides the customer's affirmative consent, an insurance provider remote server may collect data from the customer's mobile device, smart vehicle controller, or other smart devices—such as with the customer's permission or affirmative consent. The data collected may be related to certain functionalities or profiles, and/or insured assets before (and/or after) an insurance-related event, including those events discussed elsewhere herein. In return, risk averse insureds, vehicle owners, home owners, or home or apartment occupants may receive discounts or insurance cost savings related to home, renters, personal articles, auto, and other types of insurance from the insurance provider.

In one aspect, smart or autonomous vehicle data, smart or interconnected home data, mobile device data, social media data, and/or other data, including the types of data discussed elsewhere herein, may be collected or received by an insurance provider remote server, such as via direct or indirect wireless communication or data transmission from a smart or autonomous vehicle, mobile device, smart home controller, other customer computing device, or customer social media content after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as vehicles, personal belongings, or homes, and/or (ii) vehicle, home or apartment occupants.

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_________' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f). The systems and methods described herein are directed to an improvement to computer functionality, and improve the functioning of conventional computers.

Throughout this specification, the word "set", unless expressly defined otherwise, is hereby defined to mean a set having one or more elements, but not the empty set.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for system and method of identifying a vehicle while preserving privacy of a vehicle operator through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

What is claimed:

1. A computer-implemented method of identifying a vehicle while preserving privacy of a vehicle operator, the computer-implemented method comprising:
   providing a first application to a mobile computing device of the vehicle operator, wherein the first application, when installed and executing on the mobile computing device, causes the mobile computing device to
      obtain a first set of raw audio signals captured by a microphone of the mobile computing device located about the vehicle,
         wherein at least one of the raw audio signals represents a sound of the vehicle,
      transform the first set of raw audio signals into a first set of audio signal features, wherein no raw audio signal in the first set of raw audio signals can be derived from the first set of audio signal features, and
      transmit, via a communication network interface of the mobile computing device, the first set of audio signal features to a remote computing system, without transmitting any portion of the first set of raw audio signals to the remote computing system;
   receiving, at the remote computing system, the first set of audio signal features;
   identifying, by the remote computing system, a type of the vehicle at least in part by applying the first set of audio signal features to a trained neural network; and
   one or both of (i) causing, by the remote computing system, the identified type of the vehicle to be displayed to a user, and (ii) causing, by the remote computing system, the identified type of the vehicle to be provided as an input to a second application.

2. The computer-implemented method of claim 1, further comprising:
   generating, by one or more processors, the trained neural network by training a neural network using (i) a plurality of sets of audio signal features, and (ii) for each of the plurality of sets of audio signal features, a vehicle type known to correspond to the set of audio signal features,
   wherein each of the plurality of sets of audio signal features corresponds to a different one of a plurality of vehicles,
   wherein at least some of the plurality of sets of audio signal features correspond to different types of vehicles, and
   wherein each of the plurality of sets of audio signal features includes types of features that correspond to types of features within the first set of audio signal features.

3. The computer-implemented method of claim 2, wherein:
   providing the first application comprises providing data that specifies the types of features to the mobile computing device.

4. The computer-implemented method of claim 1, further comprising:
   generating, by one or more processors, the trained neural network by training an initial neural network using (i) a plurality of sets of raw audio signals, and (ii) for each of the plurality of sets of raw audio signals, a vehicle type known to correspond to the set of raw audio signals,
   wherein each of the plurality of sets of raw audio signals corresponds to a different one of a plurality of vehicles, and
   wherein at least some of the plurality of sets of raw audio signals correspond to different types of vehicles.

5. The computer-implemented method of claim 3, wherein:
   generating the trained neural network further includes using only one or more back-end layers of the initial trained neural network as the trained neural network; and
   the types of features within the first set of audio signal features correspond to intermediate outputs that one or more front-end layers of the initial trained neural network provide to the one or more back-end layers of the initial trained neural network.

6. The computer-implemented method of claim 1, wherein identifying the type of the vehicle is further based on a priori knowledge of which vehicle types are associated with the vehicle operator.

7. The computer-implemented method of claim 1, wherein the trained neural network is a convolutional neural network.

8. The computer-implemented method of claim 1, wherein identifying a type of the vehicle comprises identifying one or both of a vehicle make and a vehicle model.

9. The computer-implemented method of claim 1, wherein obtaining the first set of raw audio signals captured by the microphone of the mobile computing device comprises obtaining the first set of raw audio signals while the vehicle is in motion.

10. The computer-implemented method of claim 1, wherein obtaining the first set of raw audio signals captured by the microphone of the mobile computing device comprises obtaining the first set of raw audio signals when the vehicle ignition is activated.

11. The computer-implemented method of claim 1, comprising causing the identified type of the vehicle to be provided as the input to the second application, and wherein the second application is an application that assesses risk associated with the vehicle operator.

12. A computing system comprising:
   one or more processor; and
   one or more memories storing instructions that, when executed by the one or more processors, cause the computing system to
   provide a first application to a mobile computing device of a vehicle operator, wherein the first application, when installed and executing on the mobile computing device, causes the mobile computing device to
      obtain a first set of raw audio signals captured by a microphone of the mobile computing device located about the vehicle,
         wherein at least one of the raw audio signals represents a sound of the vehicle, transform the first set of raw audio signals into a first set of audio signal features, wherein no raw audio signal in the first set of raw audio signals can be derived from the first set of audio signal features, and transmit, via a communication network interface of the mobile computing device, the first set of audio signal features to a remote computing system, without transmitting any portion of the first set of raw audio signals to the remote computing system;

receive, at the remote computing system, the first set of audio signal features;

identify, by the remote computing system, a type of the vehicle at least in part by applying the first set of audio signal features to a trained neural network; and one or both of (i) cause, by the remote computing system, the identified type of the vehicle to be displayed to a user, and (ii) cause, by the remote computing system, the identified type of the vehicle to be provided as an input to a second application.

13. The computing system of claim 12, wherein the instructions further cause the one or more processor to generate the trained neural network by training a neural network using (i) a plurality of sets of audio signal features, and (ii) for each of the plurality of sets of audio signal features, a vehicle type known to correspond to the set of audio signal features, wherein each of the plurality of sets of audio signal features corresponds to a different one of a plurality of vehicles, wherein at least some of the plurality of sets of audio signal features correspond to different types of vehicles, and wherein each of the plurality of sets of audio signal features includes types of features that correspond to types of features within the first set of audio signal features.

14. The computing system of claim 12, wherein:
the first application comprises data that specifies the types of features to the mobile computing device.

15. The computing system of claim 12, wherein the instructions further cause the one or more processor to generate the trained neural network by training an initial neural network using (i) a plurality of sets of raw audio signals, and (ii) for each of the plurality of sets of raw audio signals, a vehicle type known to correspond to the set of raw audio signals, wherein each of the plurality of sets of raw audio signals corresponds to a different one of a plurality of vehicles, and wherein at least some of the plurality of sets of raw audio signals correspond to different types of vehicles.

16. The computing system of claim 14, wherein
the trained neural network includes only one or more back-end layers of the initial trained neural network as the trained neural network; and the types of features within the first set of audio signal features correspond to intermediate outputs that one or more front-end layers of the initial trained neural network provide to the one or more back-end layers of the initial trained neural network.

17. The computing system of claim 12, wherein the instructions further cause identification of the type of the vehicle to be based on a priori knowledge of which vehicle types are associated with the vehicle operator.

18. The computing system of claim 12, wherein the trained neural network is a convolutional neural network.

19. The computing system of claim 12, wherein the type of the vehicle comprises one or both of a vehicle make and a vehicle model.

20. A non-transitory computer readable medium containing program instructions that when executed, cause a computer to:

provide a first application to a mobile computing device of the vehicle operator, wherein the first application, when installed and executing on the mobile computing device, causes the mobile computing device to obtain a first set of raw audio signals captured by a microphone of the mobile computing device located about the vehicle, wherein at least one of the raw audio signals represents a sound of the vehicle, transform the first set of raw audio signals into a first set of audio signal features, wherein no raw audio signal in the first set of raw audio signals can be derived from the first set of audio signal features, and transmit, via a communication network interface of the mobile computing device, the first set of audio signal features to a remote computing system, without transmitting any portion of the first set of raw audio signals to the remote computing system;

receive, at the remote computing system, the first set of audio signal features;

identify, by the remote computing system, a type of the vehicle at least in part by applying the first set of audio signal features to a trained neural network; and one or both of (i) cause, by the remote computing system, the identified type of the vehicle to be displayed to a user, and (ii) cause, by the remote computing system, the identified type of the vehicle to be provided as an input to a second application.

* * * * *